US007142558B1

(12) United States Patent
Pack et al.

(10) Patent No.: US 7,142,558 B1
(45) Date of Patent: Nov. 28, 2006

(54) DYNAMIC QUEUING CONTROL FOR VARIABLE THROUGHPUT COMMUNICATION CHANNELS

(75) Inventors: Gordon Pack, Los Altos, CA (US); Kameswara Chitti, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/550,443

(22) Filed: Apr. 17, 2000

(51) Int. Cl.
*H04L 12/26* (2006.01)
(52) U.S. Cl. .................. 370/465; 370/248; 370/216
(58) Field of Classification Search ............ 370/230, 370/230.1, 235, 236, 412, 468, 216, 242, 370/241, 248, 249, 465, 464
See application file for complete search history.

(56) References Cited

U.S. PATENT DOCUMENTS

| | | | |
|---|---|---|---|
| 4,430,712 A | 2/1984 | Coulson et al. | |
| 4,849,968 A | 7/1989 | Turner | |
| 4,943,999 A | 7/1990 | Ardon | |
| 5,014,265 A | 5/1991 | Hahne et al. | |
| 5,157,654 A | 10/1992 | Cisneros | |
| 5,224,099 A | 6/1993 | Corbalis et al. | |
| 5,274,768 A | 12/1993 | Traw et al. | |
| 5,295,134 A | 3/1994 | Yoshimura et al. | |
| 5,303,078 A | 4/1994 | Brackett et al. | |
| 5,311,509 A | 5/1994 | Heddes et al. | |
| 5,313,454 A | 5/1994 | Bustini et al. | |
| 5,345,438 A | 9/1994 | Ozaki | |
| 5,359,592 A | 10/1994 | Corbalis et al. | |
| 5,365,590 A | 11/1994 | Brame | |
| 5,379,297 A | 1/1995 | Glover et al. | |
| 5,390,184 A * | 2/1995 | Morris ................ | 370/353 |
| 5,412,655 A | 5/1995 | Yamada et al. | |
| 5,434,848 A | 7/1995 | Chimento, Jr. et al. | |
| 5,469,433 A | 11/1995 | McAuley | |
| 5,499,238 A | 3/1996 | Shon | |
| 5,517,643 A | 5/1996 | Davy | |
| 5,530,698 A | 6/1996 | Kozaki et al. | |
| 5,533,009 A * | 7/1996 | Chen ................ | 370/232 |
| 5,537,611 A | 7/1996 | Rajagopal et al. | |
| 5,539,899 A | 7/1996 | Huynh et al. | |
| 5,541,912 A | 7/1996 | Choudhury et al. | |
| 5,541,919 A | 7/1996 | Yong et al. | |
| 5,542,068 A | 7/1996 | Peters | |
| 5,546,389 A | 8/1996 | Wippenbeck et al. | |
| 5,548,587 A | 8/1996 | Bailey et al. | |
| 5,550,823 A | 8/1996 | Irie et al. | |
| 5,555,264 A | 9/1996 | Sallberg et al. | |
| 5,557,604 A | 9/1996 | Usumi et al. | |

(Continued)

FOREIGN PATENT DOCUMENTS

EP 070629 8 4/1996

OTHER PUBLICATIONS

Thorne, D J. "ATM Technology Overview- what it is and what it is not". IEEE. May 23, 1997. pp. 1-6.*

(Continued)

*Primary Examiner*—Derrick Ferris
(74) *Attorney, Agent, or Firm*—Blakely, Sokoloff, Taylor & Zafman LLP

(57) ABSTRACT

A method and apparatus for queuing control of variable bandwidth communications channels. The apparatus detects a change from a first bandwidth to a second bandwidth of a communication channel. Finally a quality of service controller is adjusted to compensate for the change from a first bandwidth to a second bandwidth.

19 Claims, 4 Drawing Sheets

U.S. PATENT DOCUMENTS

| | | | |
|---|---|---|---|
| 5,557,607 A | 9/1996 | Holden | |
| 5,568,477 A | 10/1996 | Galand et al. | |
| 5,570,362 A | 10/1996 | Nishimura | |
| 5,584,015 A | 12/1996 | Villette et al. | |
| 5,592,530 A | 1/1997 | Brockman et al. | |
| 5,600,645 A * | 2/1997 | Boyer et al. | 370/395.4 |
| 5,600,820 A | 2/1997 | Johnston | |
| 5,617,416 A | 4/1997 | Damien | |
| 5,625,625 A | 4/1997 | Oskouy et al. | |
| 5,633,861 A | 5/1997 | Hanson et al. | |
| 5,649,089 A | 7/1997 | Kilner | |
| 5,663,949 A | 9/1997 | Ishibashi et al. | |
| 5,675,576 A * | 10/1997 | Kalampoukas et al. | 370/232 |
| 5,678,006 A | 10/1997 | Valizadeh et al. | |
| 5,680,582 A | 10/1997 | Slayden | |
| 5,687,167 A * | 11/1997 | Bertin et al. | 370/254 |
| 5,696,764 A * | 12/1997 | Soumiya et al. | 370/395.41 |
| 5,701,495 A | 12/1997 | Arndt et al. | |
| 5,704,047 A | 12/1997 | Schneeberger | |
| 5,742,606 A | 4/1998 | Illiadis et al. | |
| 5,742,765 A | 4/1998 | Wong et al. | |
| 5,748,629 A * | 5/1998 | Caldara et al. | 370/389 |
| 5,765,032 A | 6/1998 | Valizadeh | |
| 5,768,275 A | 6/1998 | Lincoln et al. | |
| 5,787,070 A | 7/1998 | Gupta et al. | |
| 5,793,747 A | 8/1998 | Kline | |
| 5,796,735 A | 8/1998 | Miller et al. | |
| 5,812,527 A | 9/1998 | Kline et al. | |
| 5,815,492 A * | 9/1998 | Berthaud et al. | 370/234 |
| 5,818,843 A | 10/1998 | Virdee et al. | |
| 5,828,651 A | 10/1998 | Jang et al. | |
| 5,838,677 A | 11/1998 | Kozaki et al. | |
| 5,844,901 A | 12/1998 | Holden et al. | |
| 5,850,395 A | 12/1998 | Hauser et al. | |
| 5,854,911 A | 12/1998 | Watkins | |
| 5,875,352 A | 2/1999 | Gentry et al. | |
| 5,889,760 A | 3/1999 | Yoshida et al. | |
| 5,898,670 A * | 4/1999 | Hoebeke et al. | 370/468 |
| 5,898,688 A | 4/1999 | Norton et al. | |
| 5,901,147 A | 5/1999 | Joffe | |
| 5,923,656 A | 7/1999 | Duan et al. | |
| 5,946,297 A * | 8/1999 | Calvignac et al. | 370/230 |
| 5,970,064 A | 10/1999 | Clark et al. | |
| 5,970,067 A | 10/1999 | Sathe et al. | |
| 5,974,466 A | 10/1999 | Mizutani et al. | |
| 5,978,856 A | 11/1999 | Jones | |
| 5,982,783 A | 11/1999 | Frey et al. | |
| 5,991,272 A * | 11/1999 | Key et al. | 370/252 |
| 5,995,503 A * | 11/1999 | Crawley et al. | 370/351 |
| 5,999,518 A | 12/1999 | Nattkemper et al. | |
| 5,999,533 A | 12/1999 | Peres et al. | |
| 6,008,805 A | 12/1999 | Land et al. | |
| 6,011,775 A | 1/2000 | Bonomi et al. | |
| 6,028,844 A | 2/2000 | Hao et al. | |
| 6,034,945 A | 3/2000 | Hughes et al. | |
| 6,058,114 A | 5/2000 | Sethuram et al. | |
| 6,084,880 A | 7/2000 | Bailey et al. | |
| 6,097,807 A | 8/2000 | Leslie et al. | |
| 6,130,878 A | 10/2000 | Charny | |
| 6,185,222 B1 | 2/2001 | Hughes et al. | |
| 6,317,416 B1 | 11/2001 | Giroux et al. | |
| 6,331,981 B1 | 12/2001 | Harth et al. | |
| 6,337,849 B1 * | 1/2002 | Smith et al. | 370/230 |
| 6,359,863 B1 * | 3/2002 | Varma et al. | 370/232 |
| 6,434,612 B1 | 8/2002 | Hughes et al. | |
| 6,452,905 B1 * | 9/2002 | Smith et al. | 370/236.1 |
| 6,526,060 B1 | 2/2003 | Hughes et al. | |
| 6,535,484 B1 | 3/2003 | Hughes et al. | |
| 6,563,787 B1 * | 5/2003 | Ramaswamy et al. | 370/229 |
| 6,597,698 B1 * | 7/2003 | Lundback et al. | 370/398 |

OTHER PUBLICATIONS

C. Anthony Cooper & Kun I. Park, "Toward a Broadband Congestion Control Strategy", May 1990—IEEE Network Magazine.

K. Genda, et al. "A 160 GB/s ATM Switch Using Internal Speed-up Crossbar Switch Architecture," Electronics and Communications in Japan, Part I—Communications, vol. 80, No. 9, pp. 68-78 (Sep. 1997).

M. Veeraraghavan, et al., "Parallel Connection Control (PCC) Algorithm for ATM Networks," 1996 IEEE International Conference on Communications (ICC), Converging Technologies for Tomorrow's Applications, Dallas, vol. 3, pp. 1635-1641 (Jun. 23-27, 1996).

T.F. Bowen, "Distributed Control of a Broadband Local Access Switch," World Prosperity Through Communications, Boston, vol. 3, pp. 1221-1225 (Jun. 11-14, 1989).

Sato Fumito, et al., "Functional Elements for Switching Software Based on Object Oriented Paradigm with UPT as an Example," IEICE Transactions on Communications, vol. E75-B, No. 10, pp. 1052-1060 (Oct. 1, 1992).

P. Newman, et al., "Ipsilion's General Switch Management Protocol Specification, Version 1.1," Internet Engineering Task Force, RFC 1987 (Aug. 1996).

P Newman, et al., "General Switch Management Protocol Specification, Version 1.1," Internet Engineering Task Force, Draft (Jun. 1996).

The ATM Forum Technical Committee, "Integrated Local Management Interface (LMI) Specification, Version 4.0," ATM Forum document No. af-ilmi-0065.000 (Sep. 1996).

M. Ahmed et al., "Definitions of Managed Objects for ATM Management Version 8.0 using SMIv2," Internet Engineering Task Force, RFC 1695 (Aug. 1994).

J. Case, et al., "Structure of Management Information for Version 2 of the Simple Network Management Protocol (SMNPV2), "Internet Engineering Task Force, RFC 1902 (Jan. 1996).

T. Brown, "Definitions of Managed Objects for the SONET/Sdh Interface Type," Internet Engineering Task Force, RFC 1595 (Mar. 1994).

P. Almquist, et al., "Type of Service in the Internet Protocol Suite," Internet Engineering Task Force, RFC 1349 (Jul. 1992).

Louie Fourie, "Switch Management Interface Funtional Specification," Revision 1.1, pp. 1-31 (Apr. 25, 1996).

Stratacom BPX Reference Manual, Release 8.2 EQA Draft (May 30, 1996).

Cisco BPX 8600 Series Reference, Release 9.1, pp. v-xxx, 1-1 to 2-18, and 9-1 to 9-60 (May 1998).

Hashemi et al. "A General Purpose Cell Sequencer/Scheduler for ATM Switches", IEEE, May 1997, p. 29-37.

Chao et al. "Design of Virtual Channel Queue in an ATM Terminal Adaptor", IEEE Jun. 1992, p. 294-302.

Kawahara, et al., "Performance Evaluation of Selective Cell Discard Schemes in ATM Networks," IEEE INFOCOM '96: The Conference on Computer Communications, vol. 3, pp. 1054-1061, Mar. 24-28, 1996.

Vumiokamatani, et al., "Dynamic Threshold Cotnrol for Shared Buffer ATM Switching," Shingaku Giho, Technical Report of IEICE, SSE95-12, PTO 98-3836, pp. 1-20, May 1995.

The IPX Product Family System Description, pp. 1-114 (Stratacom, Inc. 1990).

BPX Multi-Service ATM Brochure (Stratacom, Inc. 1994).

B. Phillips, "Data Transmission and Switching," Data Communications, pp. 43-45 (McGraw Hill Jan. 1994).

C.M. Chen and N. Roussopoulos, "The Implementation and Performance Evaluation of the ADMS Query Optimizer: Integrating Query Result Caching and Matching," Lecture Notes in Computer Science, Advances in Database Technology—EDBT '94, pp. 323-336 Cambridge, United Kingdom (Mar. 1994).

"Multi-Access First-In-First-Out Queue Using 370 Compare and Swap," IBM Technical Disclosure Bulletin, vol. 36, No. 2, pp. 327-330 (Feb. 1993).

The ATM Forum Technical Committee, "Traffic Management Specification Version 4.0," ATM Forum document No. af-tm-0056.000, Apr. 1996.

The ATM Forum Technical Committee, "Addendum to Traffic Management V4.0 for ABR parameter negotiation," ATM Forum document No. af-tm-077.000, Jan. 1997.

Hui Zhang, "Service Discipline For Guaranteed Performance Service in Packet-Switching Networks," Proceedings of the IEEE, vol. 83, No. 10, pp. 1-23 (Oct. 1995).

Jon C.R. Bennett and Hui Zhang, "Why WFQ is Not Good Enough For Integrated Services Networks," Proceedings of NOSSDAV'96 (Apr. 1996).

Jon C.R. Bennett and Hui Zhang, "WF2Q: Worst-case Fair Weighted Fair Queuing," Proceedings IEEE INFOCOMM '96, San Francisco, CA (Mar. 1996).

M. Shreedhar and George Varghese, "Efficient Fair Queuing using Deficit Round Robin," Proceedings of SIGCOMM '95, ACM, Cambridge, MA (1995).

Huang, Chun-Chong, et al., A Frame-Oriented Queueing Control Policy For Real-And Non-Real-Time Traffic In ATM Switches, Dept. of Electrical and Computer Engineering, University of Toronto, Toronto, Ontario, Canada M5S 1A4, Journal of High Speed Networks 3 (1994), 459-489.

Park et al. "Implementation of the ATM Adaptation Layer for VTOA Services".\, IEEE Multimedia Computing and Systems, Jun. 3, 1997-Jun. 6, 1997, pp. 95-100.

Chi et al. "Starvation Prevention for Arbiters of Crossbars with Multi-Queue Input Buffers", IEEE Compcon Spring 1994, pp. 292-297.

Moreno, Wilfrido, "Field Programmable Gate Array Design for an Application Specifie Signal Processing Algorithms", IEEE, Mar. 2-4, 1998, pp. 222-225.

* cited by examiner

DYNAMIC QUEUING CONTROL FOR VARIABLE THROUGHPUT COMMUNICATION CHANNELS

FIELD OF THE INVENTION

The present invention relates to a method and apparatus for handling information sent through a digital network and, more specifically, to a method and apparatus of traffic congestion prevention and control within the cell switching network.

BACKGROUND OF THE INVENTION

Asynchronous Transfer Mode (ATM) or "cell switching" is a method of transmitting digital information wherein the information is broken into equal sized units called "cells." The individual cells of information are transmitted from a source node to a destination node through a "channel." A channel is a pathway through a digital network. A digital network is constructed of digital switches coupled together by digital communication channels.

A typical full-integrated voice and data network using digital trunk lines (e.g., T1, FT1, E1, T3, etc.) includes a number of geographically distant interconnected nodes. Each node acts as a cell exchanger for receiving and forwarding cell information to its destination. By the use of a variety of interface cards, each node is capable of interfacing with user generated voice and data streams, then segmenting and assembling the streams into a more efficient cell format for transmission over a closed network using digital lines. Each node is also capable of receiving data from other network nodes and forwarding that data through to other network nodes to its ultimate destination. All terminal nodes also provide the necessary interface cards required to reassemble the data contained in the cells into a standard user data stream format.

Each cell originates at a source node and is transmitted across a communication channel. The communication channels carry the cells of information between the digital switches along the connection pathway. The digital switches route the cells from incoming communication channels to outgoing communication channels and finally to a destination node.

Even with sophisticated queuing and service algorithms, however, congestion (due to excess arriving traffic at a switch) can occur. If no resources are available, the connection is not allowed.

FIG. 1 illustrates a typical prior art switch 22 to switch 22 communication scheme. Voice cells of telephone 201 communicate with switch 22 via bidirectional communication links 202. Voice cells of telephone 201 are transmitted into switch 22 and stored in queue 203. Voice cells of telephone 201 leave queue 203 and are provided to cell selector 212. Likewise, workstation 204, typically via a Large Area Network (LAN) (not shown), passes workstation cells to rate controller 205 to the switch 22 over bi-directional communication links 202. The workstation cells transmitted into switch 22 are stored in queue 206. Workstation cells leave queue 206 and are provided to cell selector 212.

Cell selector 212 transmits voice and workstation cells to another switch 22 via bi-directional communication channel 42. Cell router 207 receives the cells from channel 42. Cell router 207 delivers voice cells to voice queue 208 and workstation cells to queue 209. Queue 209 passes the workstation cells on to rate controller 205 which then sends the data to workstation 204. Voice queue 208 passes the voice cells to telephone 201 via bi-directional communication links 202. Queues 206 and 209 include congestion controller 210 which provides a feedback signal 211 to rate controller 205. Rate controller 205 regulates the data rate at which workstation cells are accepted by or delivered from queues 206 and 209. Thus congestion controller 210 provides variable rate quality of service congestion control. Voice queues 203 and 208 do not implement this type of congestion control mechanism because voice cells must be delivered and received at a constant bit rate. Therefore, congestion control that varies the rate of voice cells below its minimum required transmission rate is unacceptable.

FIG. 2 illustrates a prior art scheme of data transmission implementing variable rate quality of service congestion control. As described in FIG. 1, telephone 201 transmits voice cells to switch 22 via bi-directional communication link 202 at a fixed data rate. Voice queue 203 accepts the voice cells and passes the voice cells onto cell selector 212. Likewise, workstation 204 passes workstation cells to cell selector 212 via bi-directional communication links 202, rate controller 205, queue 206 and congestion control mechanism 210. Cell selector 212 then transmits voice and workstation cells to another switch 22 via bi-directional communication channel 42. Bi-directional communication channel 42 has a variable bandwidth ($BW_A$) 218.

If channel 42 has a fixed bandwidth, the sum of the voice cell rate ($R_1$) 216 and workstation cells rate ($R_2$) 217 would be equal to $BW_A$ 218. $R_1$ 216 would be equal the fixed bandwidth ($BW_F$) 214 required by telephone 201. $R_2$ 217 would equal the variable bandwidth ($BW_V$) 215 provided by rate controller 205. Cell selector 212; therefore, would output cells at a rate equal to $BW_A$ 218 of channel 42.

If $BW_A$ 218 does not decrease, $BW_F$ 214 (representing the fixed data rate required for voice communications) is equal to $R_1$ 216 (representing the data rate at which cell selector 212 sends data to channel 42). Thus, voice queue 203 does not back-up. If the bandwidth of channel 42 increases, a similar result occurs.

However, if $BW_A$ 218 of channel 42 is decreased to a new lower value, then cell selector 212 can only output cells at a maximum rate of the lower BWA. To compensate, cell selector 212 accepts cells at a lower data rate by decreasing $R_1$ 216 to a new lower value and by decreasing $R_2$ 217 to a new lower value. The decreases in $R_1$ 216 and $R_2$ 217 are typically proportional to the decrease of $BW_A$ 218. Rate controller 205 compensates for the decrease of $R_2$ 217 so queue 206 experiences no congestion. However a decrease of $BW_A$ 218, causes voice cells from telephone 201 to experience congestion at voice queue 203. The cause of this congestion is apparent from the following example.

Suppose $BW_A$ 218 is 2,000 cells per second, $BW_V$ 215 is 1,000 cells per second and $BW_F$ 214 requires 1,000 cells per second to properly transmit voice cells. Neither voice queue 203 nor queue 206 suffer congestion and there is no data loss. Now suppose $BW_A$ 306 is reduced to 1,500 cells per second. Cell selector 212 is forced to output cells at a rate no greater than 1,500 cells per second. Therefore, cell selector 212 sets $R_1$ 216 and $R_2$ 217 to 750 cells per second. Queue 206 suffers no congestion since congestion control mechanism 210 and rate controller 205 reduce the data flowing into queue 206 to 750 cells per second. However, voice queue 203 suffers congestion and cell loss 213 because $BW_F$ 214 still requires a data rate of 1,000 cells per second, but $R_1$ 216 is only 750 cells per second. Thus voice queue 203 is congested and backs-up causing 250 cells per second of lost cells 213 from voice queue 203. The quality of service is very poor for voice since one quarter of the cells are lost.

SUMMARY OF THE INVENTION

A method for queuing control of variable bandwidth communications channels is disclosed. A change from a first bandwidth to a second bandwidth of a communication channel is detected. A quality of service controller is adjusted to compensate for the change from a first bandwidth to a second bandwidth.

Other features and advantages of the present invention will be apparent from the accompanying drawings and from the detailed description that follows below.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Techniques for implementing dynamic queuing control are disclosed. As will be discussed in greater detail below, in one embodiment of the invention, by monitoring changes in the bandwidth of a communications channel between two network switches, a quality of service controller dynamically allocates and maintains fixed minimum transmission rates for high priority cell traffic. When a decrease in bandwidth of the channel occurs, high priority cells are allocated the fixed minimum transmission rate required to prevent the delay and loss of these high priority cells.

One advantage is to prevent the delay or loss of high priority cells, thus improving the quality of service of a communications network having a variable throughput communication channel. Another intended advantage is to improve the latency—i.e., reduce the congestion experienced at a queue—caused by a decrease in bandwidth of a variable throughput communication channel.

Figure 1:
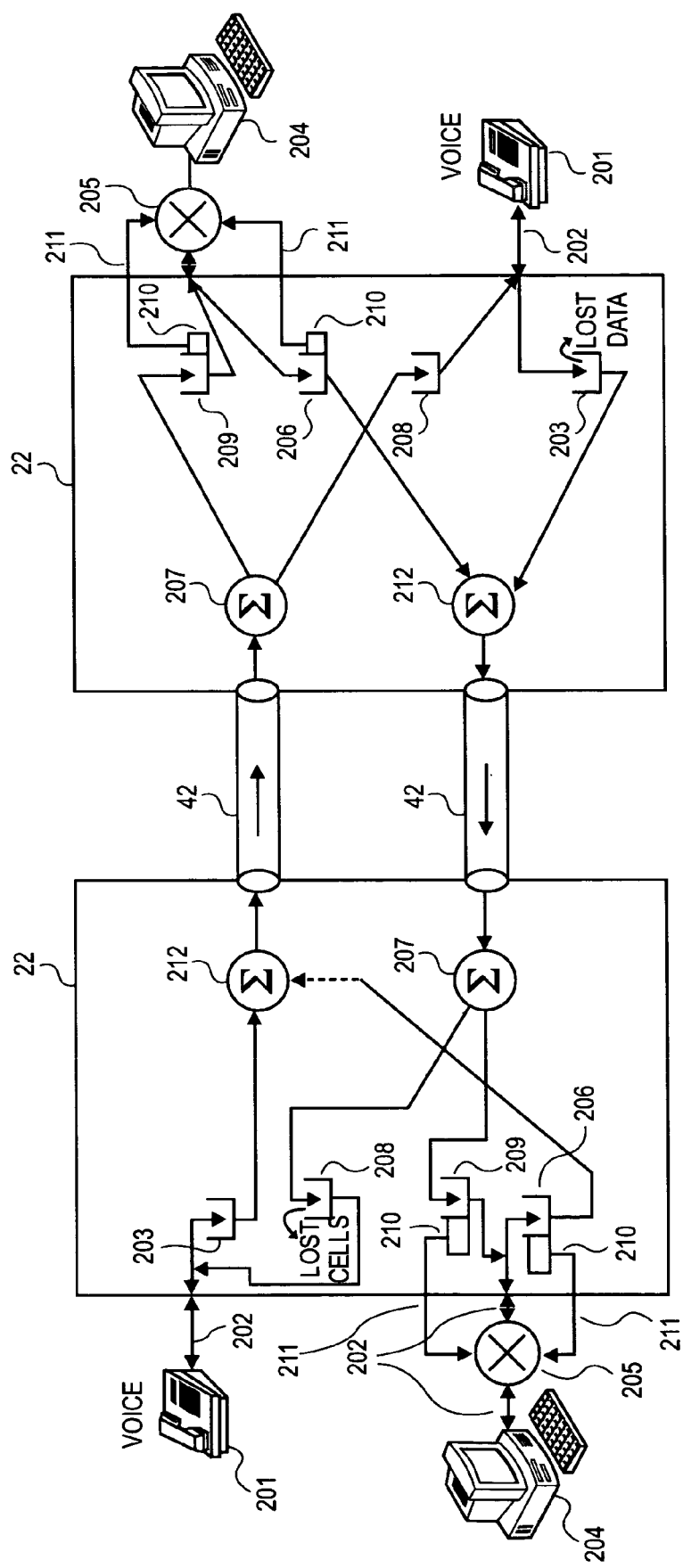
FIG. 1 illustrates a prior art internal block diagram of a digital switch.
Figure 2:
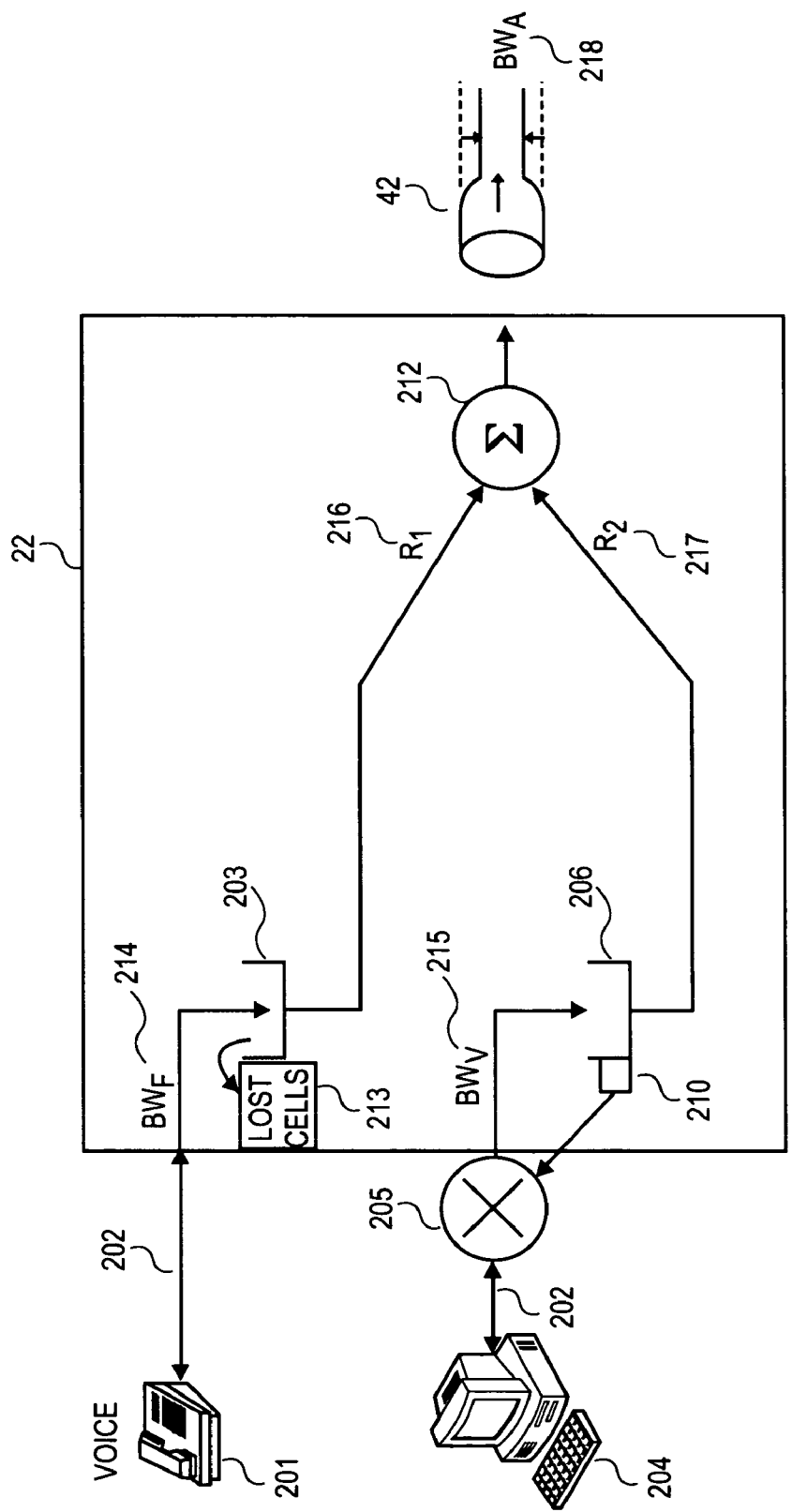
FIG. 2 illustrates a prior art scheme of data transmission.
Figure 3:
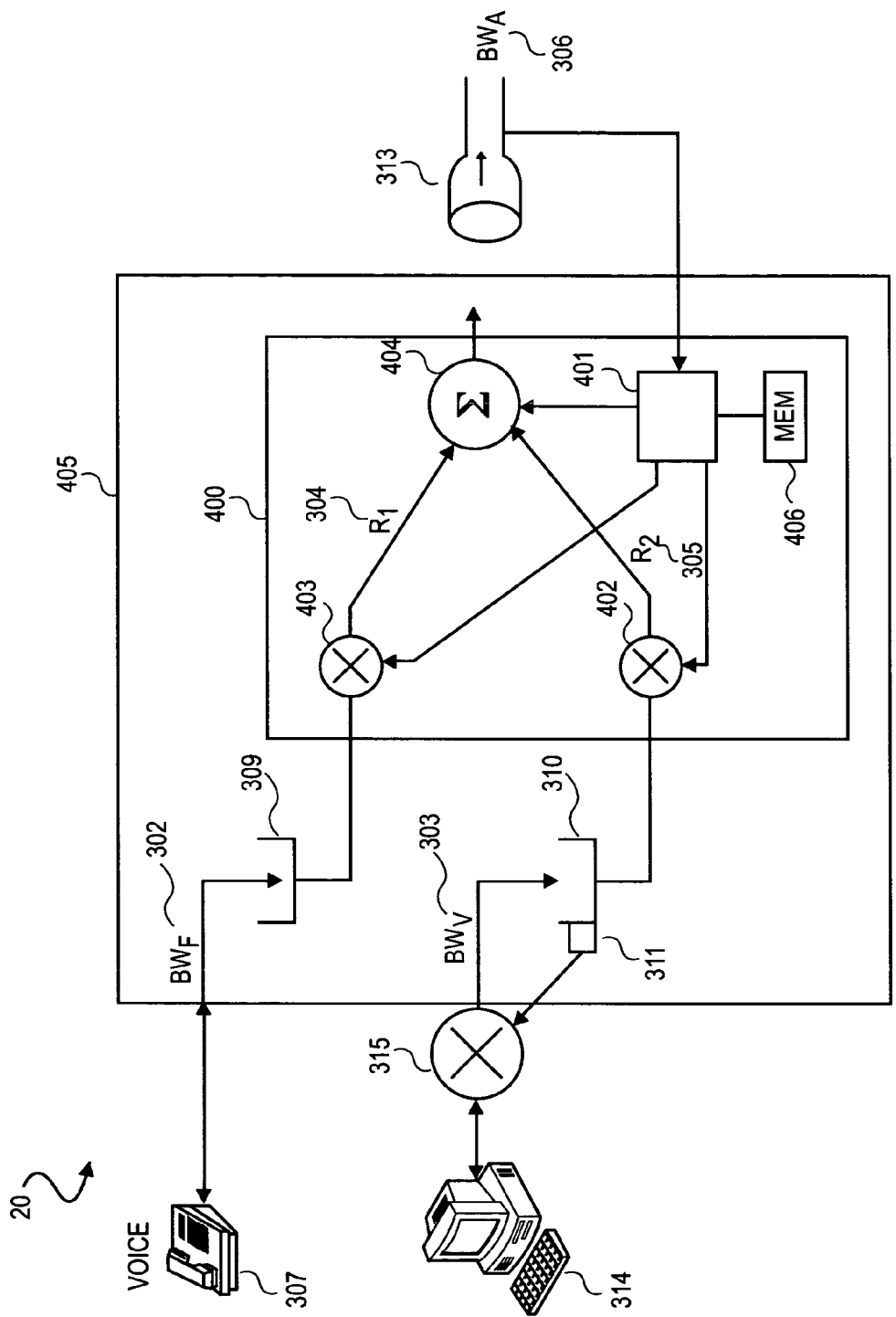
FIG. 3 illustrates a communication scheme implementing dynamic queue control for variable throughput communication channels according to one embodiment of the present invention.

FIG. 3 illustrates a communication scheme implementing dynamic queue control for variable throughput communication channels. Although only described with respect to two data sources and paths—i.e., fixed bandwidth voice cells from telephone 307 and variable bandwidth workstation cells from workstation 314—a great number of sources of different traffic classes may be used. For example, one source may be video, another source may be a mainframe, and another a satellite.

Typically, switches are capable of handling many different classes of cell traffic, each class having different characteristics and different service requirements. The various classes of cell traffic might include high priority traffic, voice, high speed deterministic traffic, bursty data, etc. For example, voice traffic is relatively delay sensitive and insensitive to occasional cell loss. In contrast, data traffic, such as file transfer, is relatively insensitive to delay but is data loss sensitive. High priority data is both delay and loss sensitive. To accommodate these differences, each class of traffic is typically placed in a preassigned queue, each with a different service priority.

Switch 405 includes a quality of service controller 400. For one embodiment, controller 400 interfaces with the outputs of voice queue 309 and queue 310. Controller 400 transmits cells to channel 313. Although described with respect to T1 lines, the channel 313 could be any communication channel, including but not limited to a fiberoptic line and a magnetic carrier wave such as microwave or radio frequency communication links. Bi-directional communication channel 313 has a certain available variable bandwidth ($BW_A$) 306. $BW_A$ 306 could decrease for many reasons. For example, if channel 313 is a trunk of T1 lines and one T1 line fails or is broken, $BW_A$ 306 is decreased. In another example if channel 313 is a radio frequency link that is distorted in a lightning storm $BW_A$ 306 is decreased.

Controller 400 includes a rate controller for each data class. Thus, for voice cells from voice queue 309, requiring a fixed transmission rate, controller 400 has voice rate controller 403. And for workstation cells output from queue 310 requiring only a variable transmission rate, controller 400 has a workstation rate controller 402. Both voice rate controller 403 and workstation rate controller 402 continuously provide cells to cell selector 404. As will be discussed in greater detail below, cell selector 404 in turn transmits cells to another switch 405 via channel 313.

Controller 400 includes processor 401 to control channel 313 and rate controllers 402 and 403. For one embodiment, processor 401 is a MIPS™ 4650 processor sold by MIPS Technologies, Inc., 1225 Charleston Road, Mountain View, Calif. For alternative embodiments, processor 401 could be another type of processor.

The software implementing embodiments of the present invention can be stored in main memory 406 or any other storage medium accessible to processor 401. This software may also be resident on an article of manufacture comprising a computer readable mass storage medium, or propagated digital signal having computer readable program code embodied therein and being readable by the mass storage device and for causing the processor 401 to perform digital information library transactions and protocols in accordance with the teachings herein.

Processor 401 calculates $BW_A$ 306. Given $BW_A$ 306, processor 401 calculates values of voice cell rate ($R_1$) 304 and workstation cell rate ($R_2$) 305 that prevent data loss and congestion in queues 309 and 310 respectively. Specifically, bandwidth is allocated from $BW_A$ 306 such that $R_1$ 304 is set to equal fixed bandwidth ($BW_F$) 302 required by telephone 307. Thus, voice queue 309 experiences no congestion or latency (i.e., a back-up in the queue). $R_2$ 305 is allocated the remaining bandwidth from $BW_A$ 306. Therefore, there is no data loss and the quality of service requirements are met since the minimum data rate required by voice is maintained. From their respective queues, rate controllers 402 and 403 output cells to cell selector 404 at rates $R_1$ 304 and $R_2$ 305 respectively.

Selector 404 functions like a multiplexer. Selector 404 has multiple inputs for receiving cells from queues 309 and 310 and transmits a single stream of cells composed of cells from the various queues 309 and 310. Queues 309 and 310 continuously provide cells for transmission to selector 404. Selector 404 chooses cells from either queue 309 or 310 based upon their priority. A cell's priority is determined by the rate requirements of the source's class. For example, since voice cells require a fixed minimum bandwidth ($BW_F$) 302 for transmission, voice cells from voice queue 309 are given a higher priority than workstation cells from queue 310. In other words selector 404 may be programmed to transmit two voice cells from queue 309 for every workstation cell provided by queue 310. Therefore, cell selector 404 outputs cells at a rate of the sum of $R_1$ 304 and $R_2$ 305. The sum of $R_1$ 304 and $R_2$ 305 equals $BW_A$ 306. In another embodiment, as described above, a multitude of sources having associated priorities provide cells to queues such that cell selector 404 is programmed to transmit cells into channel 313 based upon the multitude of sources' priorities.

The following example further clarifies the queuing control of one embodiment of the present system. Referring to FIG. 3, suppose telephone 307 requires a fixed bandwidth ($BW_F$) 302 data rate of 1,000 cells per second to maintain communications with other telephones in system 20. Workstation 314 has a variable bandwidth ($BW_V$) 303 controlled by congestion controller 311 and rate controller 315 of 1,000 cells per second. Under normal conditions $BW_A$ 306 is 2,000 cells per second and handles all data from telephone 307 and workstation 314. Now suppose $BW_A$ 306 is reduced to 1,500 cells per second. Processor 401 detects this change in $BW_A$ 306 and adjusts $R_1$ 304 to maintain the required voice rate of telephone 307 of 1,000 cells per second. Processor 401 calculates the remaining available bandwidth for workstation 314 as 500 cells per second and adjusts $R_2$ 305 and cell selector 404 to transmit data from workstation 314 through channel 313 at a rate of 500 cells per second. Congestion controller 311 and rate controller 315 adjust $BW_V$ 303 such that queue 310 maintains its quality of service. During periods of network traffic congestion, when network traffic demand exceeds the network's bandwidth capacity, servicing algorithms are typically employed to discriminate between traffic classes in order to allocate bandwidth. Delay is managed by properly sizing the queue depths and prioritizing transmission within a class based upon a measure of the time that a cell has been in the network as, for example, by use of time stamps and hop counts.

Thus, no data is lost or excluded due to congestion at queues 309 or 310. If processor 401 detects an increase in $BW_A$ 306, then $R_1$ 304 and $R_2$ 305 are adjusted to allow the maximum data rate possible. If $BW_A$ 306 remains unchanged, then $R_1$ 304 and $R_2$ 305 also remain unchanged.

Figure 4:
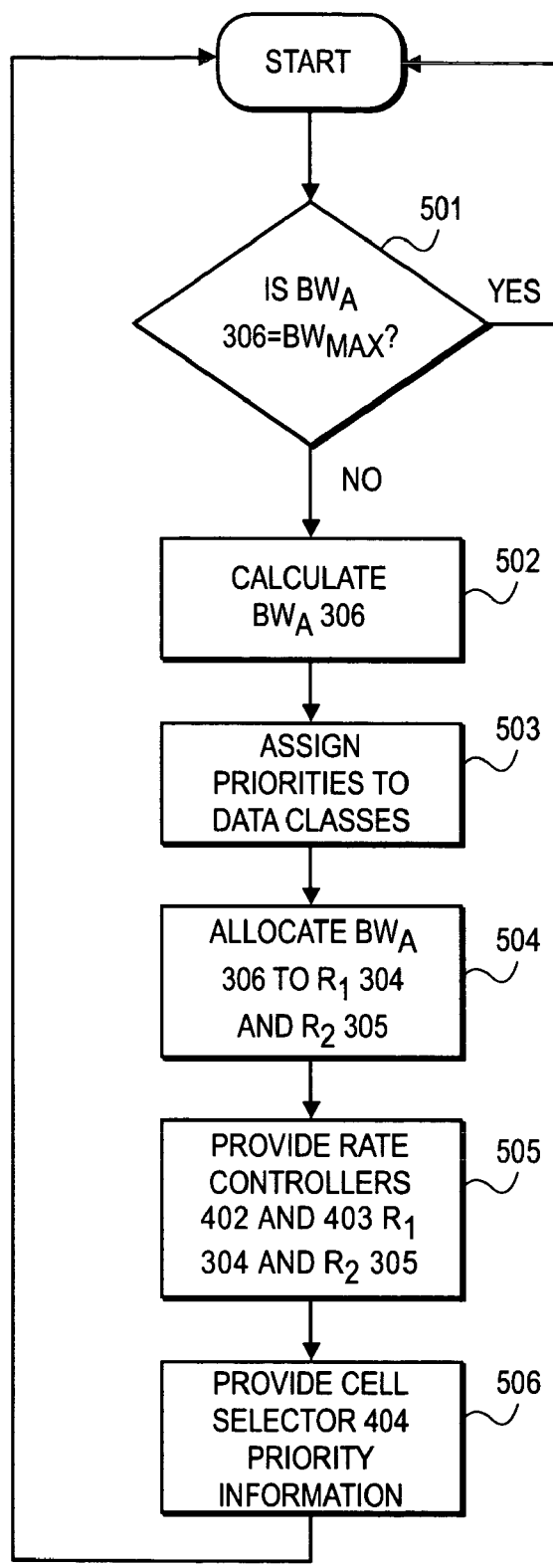
FIG. 4 illustrates a flow diagram of processing logic carried out in one embodiment of the present invention.

Data loss in queue 309 is prevented as follows. FIG. 4 is a flow chart of the logic implemented by processor 401. In decision block 501, processor 401 determines if $BW_A$ 306 is the maximum possible bandwidth of channel 313. In one embodiment, each line that is part of channel 313 is "pinged" to determine if it is still active. In other embodiments, other handshaking methods are used. If maximum $BW_A$ 306 is available, processor 401 continues to monitor the channel 313 for a change in bandwidth. If no, in processing block 502, processor 401 calculates the available bandwidth of channel 313. In processing block 503, priority is assigned to each class of data as described above to ensure a constant data rate for sources requiring a minimum fixed data rate such as voice transmissions. In processing block 504, the total available bandwidth 306 of channel 313 is allocated to data sources based upon the assigned priorities. For example, processor 401 may allocate two voice cells to be transmitted by selector 404 for every one workstation cell transmitted. Thus $R_1$ 304 would equal two thirds $BW_A$ 306 and $R_2$ 305 would equal one third $BW_A$ 306.

Also in processing block 504, data classes are calculated such that fixed data rate classes are allocated their minimum required bandwidth and variable data rate classes are allocated the remaining bandwidth. For example, if $R_1$ 304 requires all of $BW_A$ 306 to maintain voice transmissions, processor 401 would set $R_1$ 304 equal to $BW_A$ 306. $R_2$ 305 would be allocated any remaining bandwidth from $BW_A$ 306. In processing block 505, processor 401 provides rate controllers 402 and 403 the workstation and voice rate values respectively. In processing block 506, processor 401 provides cell selector 404 priority information for selecting higher priority cells to guarantee a minimum bandwidth for fixed rate data sources such as voice as described above. Upon completion of block 506, flow control is passed back to decision block 501 and the $BW_A$ 306 of channel 313 is continuously monitored. Thus processor logic ensures that no data type is excluded or lost due to congestion.

Thus, techniques for implementing dynamic queuing control have been disclosed that prevents the delay or loss of high priority cells. As a result a switch has an improved quality of service. Further advantages include improved latency since queues 309 and 310 have decreased congestion.

In the forgoing specification, the invention has been described with reference to specific exemplary embodiments thereof. If will, however, be evident that various modifications and changes may be made thereto without deporting from the broader spirit and scope of the invention as set forth in the appended claims. The specification and drawings are, accordingly, to be regarded in an illustrative rather than a restrictive manner.

What is claimed is:

1. A method for queuing control of variable bandwidth communications channels comprising:
   detecting a change from a first bandwidth to a second bandwidth of a communication channel, the communication channel including a plurality of lines;
   calculating the second providing the second bandwidth via a feedback loop to a transmission rate selector based upon how many of the plurality of lines are broken; and
   selecting a first and a second queued cells for transmission based upon an associated transmission priority, wherein the first queued cells have a higher transmission priority than the second queued cells.

2. The method of claim 1, further comprising maintaining quality of service.

3. The method of claim 1, wherein a cell selector selects first and second queued cells for transmission based upon their associated priority.

4. The method of claim 1, further comprising:
   adjusting a quality of service controller to compensate for the change from the first bandwidth to the second bandwidth.

5. The method of claim 4, wherein adjusting the quality of service controller further comprises:
   calculating the second bandwidth;
   providing the second bandwidth via a feedback loop to a transmission rate selector; and
   computing transmission rates.

6. The method of claim 5, further comprising:
   queuing first data cells of having fixed transmission rates;
   assigning a high transmission priority to the first data cells;
   queuing second data cells having variable transmission rates; and
   assigning a lower priority to the second data cells.

7. The method of claim 1, wherein the change includes one or more lines of the plurality of lines becoming active and one or more lines of the plurality of lines being broken.

8. An apparatus comprising:
- means for detecting a change from a first bandwidth to a second bandwidth of a communication channel, the communication channel including a plurality of lines;
- means for calculating the second bandwidth based upon how many of the plurality of lines are broken; and
- means for selecting a first and a second queued cells for transmission using the second bandwidth based upon an associated transmission priority, wherein the first queued cells have a higher transmission priority than the second queued cells.

9. The apparatus of claim 8, further comprising:
- means for adjusting a quality of service controller to compensate for the change from the first bandwidth to the second bandwidth.

10. The apparatus of claim 9, wherein the means for adjusting the quality of service controller further comprises:
- means for providing the second bandwidth via a feed back loop to a transmission rate selector; and
- means for computing transmission rates.

11. The apparatus of claim 10, further comprising:
- means for maintaining quality of service.

12. The apparatus of claim 10 further comprising:
- means for queuing first data cells of having fixed transmission rates;
- means for assigning a high transmission priority to the first data cells;
- means for queuing second data cells having variable transmission rates; and
- means for assigning a lower priority to the second data cells.

13. The apparatus of claim 12, wherein a cell selector selects first and second queued cells for transmission based upon their associated priority.

14. A computer-readable medium having stored thereon a plurality of instructions, said plurality of instructions when executed by a computer, cause said computer to perform the method of:
- detecting a change from a first bandwidth to a second bandwidth of a communication channel, the communication channel including a plurality of lines;
- calculating the second bandwidth based upon how many of the plurality of lines are broken; and
- selecting a first and a second queued cells for transmission based upon an associated transmission priority, wherein the first queued cells have a higher transmission priority than the second queued cells, wherein the first queued cells have a higher transmission priority than the second queued cells.

15. The computer-readable medium of claim 14 having stored thereon additional instructions, said plurality of instructions when executed by a computer, cause said computer to further perform the method of:
- providing the second bandwidth via a feed back loop to a transmission rate selector; and
- computing transmission rates.

16. The computer-readable medium of claim 15 having stored thereon additional instructions, said plurality of instructions when executed by a computer, cause said computer to further perform the method of maintaining quality of service.

17. The computer-readable medium of claim 15 having stored thereon additional instructions, said plurality of instructions when executed by a computer, cause said computer to further perform the method of:
- queuing first data cells of having fixed transmission rates;
- assigning a high transmission priority to the first data cells;
- queuing second data cells having variable transmission rates; and
- assigning a lower priority to the second data cells.

18. The computer-readable medium of claim 17 having stored thereon additional instructions, said plurality of instructions when executed by a computer, cause said computer to further perform the method of selecting first and second queued cells for transmission based upon their associated priority by the cell selector.

19. The computer readable medium of claim 14, wherein the change includes one or more lines of the plurality of lines becoming active and one or more lines of the plurality of lines being broken.

* * * * *